A. B. FIELD.
VENTILATING MEANS FOR DYNAMO ELECTRIC MACHINES.
APPLICATION FILED AUG. 2, 1913.

1,196,345. Patented Aug. 29, 1916.

WITNESSES:

INVENTOR
Allan B. Field
BY
Wesley G. Carr
ATTORNEY

UNITED STATES PATENT OFFICE.

ALLAN B. FIELD, OF PITTSBURGH, PENNSYLVANIA, ASSIGNOR TO WESTINGHOUSE ELECTRIC AND MANUFACTURING COMPANY, A CORPORATION OF PENNSYLVANIA.

VENTILATING MEANS FOR DYNAMO-ELECTRIC MACHINES.

1,196,345.   Specification of Letters Patent.   Patented Aug. 29, 1916.

Application filed August 2, 1913. Serial No. 782,564.

*To all whom it may concern:*

Be it known that I, ALLAN B. FIELD, a subject of the King of England, and a resident of Pittsburgh, in the county of Allegheny and State of Pennsylvania, have invented a new and useful Improvement in Ventilating Means for Dynamo-Electric Machines, of which the following is a specification.

My invention relates to dynamo-electric machines, and it has special reference to ventilating means for turbo-generators.

The object of my invention is to provide an effective, reliable, simple and inexpensive means for cooling certain parts of turbo-generators or other dynamo-electric machines during the operation thereof.

It has been customary heretofore to provide annular vent spaces in the cores of dynamo-electric machines, with spacing fingers disposed in said spaces for mechanical reasons. It has also been more or less customary in turbo-generators to provide longitudinally-disposed openings in the cores which communicate with said vent spaces. However, in many machines, the circumferential distance between the bottom of coils was relatively short, and a spacing finger, which must necessarily be disposed between said coils, obstructed the free passage of the cooling air, and, consequently, caused an overheating of certain parts of the machine.

According to my present invention, I provide a simple means for overcoming the above-described objectionable feature.

In order to allow a free circulation of the cooling air through the vent spaces, I provide a spacing finger having an opening at the end adjacent to the coils, said finger, however, being sufficiently strong to perform its mechanical positioning function.

Figure 1:
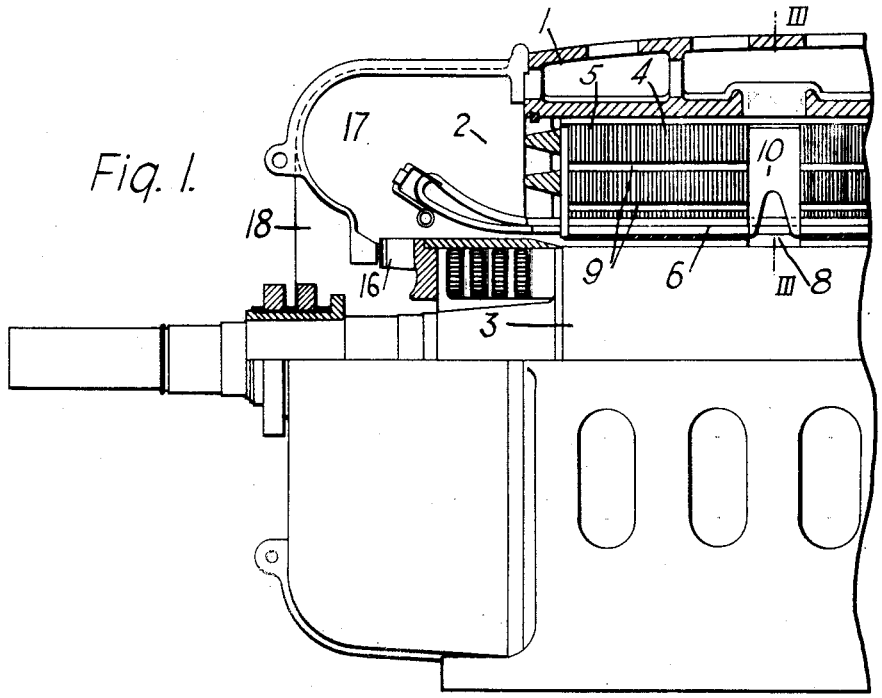
Figure 2:
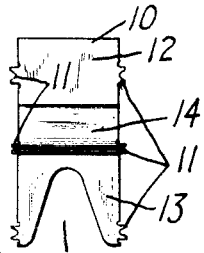
Figure 3:
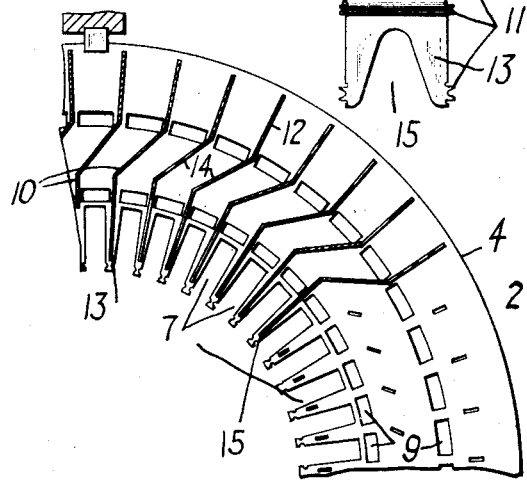

In the accompanying drawing, Figure 1 is a view, partially in side elevation and partially in longitudinal section of a portion of a dynamo-electric machine embodying my invention; Fig. 2 is a view in front elevation of a typical spacing-finger employed in the machine shown in Fig. 1, and Fig. 3 is a view in section on the line III—III of Fig. 1.

Referring to the drawings, a dynamo-electric machine, here shown as a turbo-generator 1, comprises a stator 2 and a rotor 3.

My invention, for illustrative purposes, is shown as embodied in the stator 2 only, although it will be understood that I am not limited to that structure. It is assumed that the main constructional features of the machine 1 are sufficiently well known to require no further description. Consequently, only the parts relevant to my invention will be described.

The stator 2 comprises a core 4 built up of laminations 5 and a plurality of coils 6 disposed in slots 7 in said core, as is customary. One or more circumferentially-disposed vent spaces 8 are provided, and also a plurality of longitudinally-disposed ventilating openings 9 which communicate with the vent spaces 8. Within the vent spaces are located a plurality of equally spaced and radially disposed spacing fingers 10 which are attached to the laminations 5 at the sides of the vent space 8 by means of a plurality of pointed projections or tongues 11. (See Fig. 2.) As will be understood, the spacing fingers serve to prevent displacement of the laminations, as well as to direct the air currents outwardly to circulate around the coils.

The particular type of finger 10 illustrated comprises two offset, substantially parallel, and radially disposed end portions 12 and 13, respectively, which are connected by an inclined portion 14. The fingers 10 are attached to the laminations 5 between the several slots 7 and between the several axial openings 9, so far as feasible. Each finger 10 is provided with a V-shaped opening 15 at the end adjacent the coils 6 to allow a free passage of air, as hereinbefore described.

A plurality of fan blades 16 are attached to the end of the rotor 3 within a chamber 17 in the frame 18 as is customary.

Assuming the machine to be operating under normal conditions, the ventilation of the stator is accomplished as follows: The blades 16 revolve within the chamber 17 and create a certain pressure therein. Air is thereby forced through the openings 9 in the core 4 to the vent space 8. The air is then free to circulate around the coils 6 by reason of the openings 15 in the ends of the spacing-fingers 10, as hereinbefore described.

I do not wish to be restricted to the specific structural details herein set forth, as many modifications may be made within the spirit and scope of my invention. I, therefore, desire that only such limitations shall be imposed as are indicated in the appended claims.

I claim as my invention:

1. A laminated structure comprising a plurality of substantially annular sections having radial teeth, the said sections being arranged in groups, and a plurality of spacing members disposed intermediate said groups, each of said members being provided with an opening located between the teeth of adjacent end-sections.

2. A laminated structure comprising a plurality of substantially annular sections having spaced radial teeth, the said sections being arranged in groups, and a plurality of radial spacing members disposed intermediate said groups, each of said members being provided with an opening located between the teeth of adjacent end-sections.

3. A laminated structure comprising a plurality of sections arranged in groups, the end members of which are provided with recessed portions, and a plurality of spacing members disposed intermediate said groups and severally provided with projections to engage said recessed portions and further provided at one end with an opening located between certain of said projections.

4. A laminated structure comprising a plurality of sections arranged in groups, the end members of which are provided with recessed portions, and a plurality of radially-disposed, separated, spacing members located between said groups and severally provided with projections to engage said recessed portions and further provided at one end with a V-shaped opening located between certain of said projections.

5. In a dynamo-electric machine, the combination with a core comprising a plurality of spaced sections and having a plurality of longitudinally-disposed openings extending through the same, of a plurality of spacing members disposed intermediate said sections and severally having an opening at one end adjacent to one of said longitudinal openings, thereby providing an annular passage for the circulation of a cooling medium.

6. In a dynamo-electric machine, the combination with a core comprising a plurality of spaced sections and having a plurality of longitudinally-disposed openings extending through the same, of a plurality of radially-disposed, separated, spacing members severally located between said sections and having a V-shaped opening at one end adjacent to one of said longitudinal openings, thereby providing an annular passage for the circulation of a cooling medium.

7. In a dynamo-electric machine, the combination with a core comprising a plurality of spaced sections and having a plurality of longitudinally-disposed openings extending through the same, of a plurality of radially-disposed, equally-spaced, spacing-fingers severally located between said sections and attached thereto and severally having a V-shaped opening at one end adjacent to one of said longitudinal openings, thereby providing an annular passage for the circulation of a cooling medium.

8. A spacing member adapted for use in a laminated structure, provided along its edges with a plurality of projecting tongues and having an opening at one end located between certain of said tongues.

9. A spacing member adapted to use in a laminated structure, provided along its edges with a plurality of projecting tongues and having a V-shaped opening at one end located between certain of said tongues.

10. A spacing member adapted for use in a laminated structure, provided along its edges with a plurality of pairs of oppositely-disposed projecting tongues and having an opening at one end located between a pair of said tongues.

11. A spacing-finger adapted for use in a laminated structure and comprising two offset and substantially parallel end-portions one of which has a V-shaped opening therein, an intermediate inclined connecting portion, and a plurality of oppositely disposed tongues provided along the edges of said portions and on each side of said opening for attaching said finger to said structure.

12. A spacing finger adapted for use in a laminated structure and comprising two offset and substantially parallel end-portions one of which has an opening therein, an intermediate inclined connecting portion and a plurality of projections disposed along the edges of said portions and on each side of the said opening for attaching said finger to said structure.

In testimony whereof, I have hereunto subscribed my name this 26th day of July 1913.

ALLAN B. FIELD.

Witnesses:
L. A. KUYSER,
B. B. HINES.